US010684414B1

(12) United States Patent
Woods et al.

(10) Patent No.: US 10,684,414 B1
(45) Date of Patent: Jun. 16, 2020

(54) INTERCONNECT BETWEEN DIFFERENT MULTI-QUANTUM WELL WAVEGUIDES IN A SEMICONDUCTOR PHOTONIC INTEGRATED CIRCUIT

(71) Applicant: Ciena Corporation, Hanover, MD (US)

(72) Inventors: Ian Nicholas Woods, Nepean (CA); Kelvin Prosyk, Luskville (CA)

(73) Assignee: Ciene Corporation, Hanover, MD (US)

( * ) Notice: Subject to any disclaimer, the term of this patent is extended or adjusted under 35 U.S.C. 154(b) by 0 days.

(21) Appl. No.: 16/260,863

(22) Filed: Jan. 29, 2019

(51) Int. Cl.
  G02B 6/122 (2006.01)
  G02B 6/28 (2006.01)
  G02B 6/42 (2006.01)
  G02F 1/225 (2006.01)
  G02F 1/025 (2006.01)
  G02F 1/21 (2006.01)

(52) U.S. Cl.
  CPC ......... G02B 6/1228 (2013.01); G02B 6/2813 (2013.01); G02B 6/4201 (2013.01); G02F 1/025 (2013.01); G02F 1/225 (2013.01); G02F 2001/217 (2013.01)

(58) Field of Classification Search
  CPC .................................................. G02B 6/1228
  See application file for complete search history.

(56) References Cited

U.S. PATENT DOCUMENTS

| 6,158,901 | A * | 12/2000 | Kovacic ............ G02B 6/42 385/88 |
| 6,895,134 | B2 * | 5/2005 | Glogovsky ............ G02B 6/132 257/14 |
| 7,184,207 | B1 | 2/2007 | Walker et al. |
| 8,903,202 | B1 | 12/2014 | Prosyk et al. |
| 9,182,546 | B2 | 11/2015 | Prosyk et al. |
| 9,804,425 | B1 | 10/2017 | Prosyk |
| 2003/0021569 | A1 * | 1/2003 | Sidorin ............ G02B 6/12004 385/132 |
| 2003/0210723 | A1 | 11/2003 | Adams et al. |
| 2004/0202402 | A1 * | 10/2004 | Glogovsky ............ G02B 6/132 385/14 |
| 2005/0201437 | A1 | 9/2005 | Reid et al. |
| 2007/0145347 | A1 * | 6/2007 | Katayama ............ B82Y 10/00 257/9 |
| 2007/0223543 | A1 | 9/2007 | Prosyk et al. |
| 2009/0201958 | A1 * | 8/2009 | Albrecht ............ H01S 5/02248 372/36 |
| 2013/0163913 | A1 | 6/2013 | Prosyk |

FOREIGN PATENT DOCUMENTS

| WO | 2007/036702 A1 | 4/2007 |
| WO | 2007/107782 A1 | 9/2007 |

* cited by examiner

Primary Examiner — Sung H Pak
(74) Attorney, Agent, or Firm — Clements Bernard Walker; Christopher L. Bernard; Lawrence A. Baratta, Jr.

(57) ABSTRACT

A method includes obtaining a Photonic Integrated Circuit (PIC) with a butt-joint between a first core and a second core, wherein the butt-joint includes a poor quality region, wherein the first core is associated with a first optical device and the second core is associated with a second optical device, and wherein the first optical device and the second optical device are each on the PIC; etching away at least part of the poor quality region to form an etch trench between the first core and the second core; and growing an interconnect core between the first core and the second core in the etch trench.

19 Claims, 12 Drawing Sheets

First Device,
First waveguide width

Extended interconnect region,
interconnect waveguide width
(tapered)

Second Device, second
waveguide width

INTERCONNECT BETWEEN DIFFERENT MULTI-QUANTUM WELL WAVEGUIDES IN A SEMICONDUCTOR PHOTONIC INTEGRATED CIRCUIT

FIELD OF THE DISCLOSURE

The present disclosure generally relates to semiconductors, specifically photonic integrated circuits. More particularly, the present disclosure relates to systems and methods for a low loss, defect-free waveguide interconnect between two different Multi-Quantum Well (MQW) active core waveguides in a semiconductor Photonic Integrated Circuit (PIC).

BACKGROUND OF THE DISCLOSURE

Figure 1:
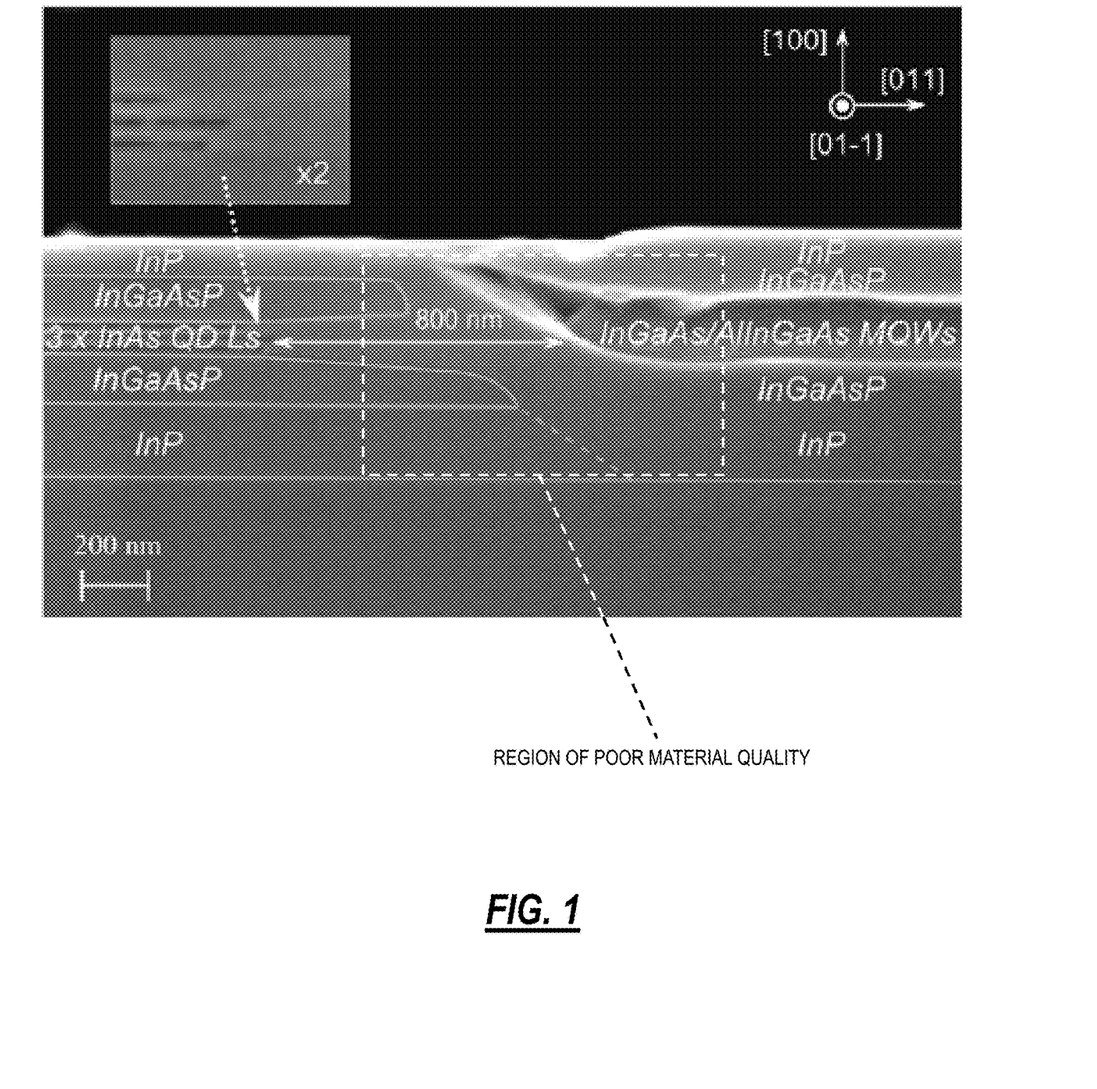
FIG. 1 is a scanning electron micrograph image of an example conventional butt-joint between different Multi-Quantum Well (MQW) structures.

Re-growth of bulk waveguide layers forming butt-joints with MQW structures has been used extensively, such as in the formation of spot-size converters, for example. However, using such structures as low loss, low-defect optical interconnect waveguides to connect different functions within a PIC is emerging. Work investigating the fabrication of devices with substantially different MQW structures has focused on attempting to create good quality butt-joint morphology directly between the two MQW structures (an example conventional butt-joint between different MQW structures is illustrated in FIG. 1). This is challenging and leads to substantial compromises in design and performance. It is also common practice to find one MQW structure which can perform all the necessary functions for a PIC. For applications which require both optical gain and optical phase change, this is also challenging. The shortcomings of direct butt-joint MQW crystal growth is a high-reliability hazard and high optical losses. These issues lead to reduced manufacturing yields, increased cost, and reliability issues. Use of a single common MQW for all-optical functions within a PIC generally leads to design compromises which result in reduced performance. This leads to high-cost products or products which are suboptimal.

BRIEF SUMMARY OF THE DISCLOSURE

In an embodiment, a method includes obtaining a Photonic Integrated Circuit (PIC) with a butt-joint between a first core and a second core, wherein the butt-joint comprises a poor quality region, wherein the first core is associated with a first optical device and the second core is associated with a second optical device, and wherein the first optical device and the second optical device are each on the PIC; etching away at least part of the poor quality region to form an etch trench between the first core and the second core; and growing an interconnect core between the first core and the second core in the etch trench. The first core and the second core can each be a Multi-Quantum Well (MQW) structure with different characteristics. The different characteristics can include any of a number of pairs of quantum wells, thickness, and bounding layers. The method can further include performing the growing concurrently with a growing step to define a waveguide spot-size converter. The growing the interconnect core can include forming a core layer for optical coupling between the first core and the second core and bounding the core layer with at least one cladding layer. The core layer can be InGaAsP and the cladding layers can be undoped InP. The growing can utilize Selective Area Growth (SAG). The etching away the poor quality region can include removing material from both the first optical device and the second optical device on the PIC. The interconnect core can be formed with a taper in thickness between the first core and the second core.

Each of the first device, the second device, and the interconnect core can have associated with them a laterally guiding waveguide having, respectively, a first width, a second width, and an interconnect width, and wherein the interconnect width can taper between the first width and the second width. The method can further include etching away at least one of the first core and the second core in a second etched region outside and adjacent to the region of poor quality, such that the combination of the etch trench and the second etched region form an extended etch trench, wherein the growing the interconnect core includes growing an extended interconnect core within the extended etch trench. The extended interconnect core can have a third optical device associated with it, and wherein the third optical device can be one of a spot size converter, an optical routing device, a multi-mode interference device, and an optical phase shifter. The first optical device can be one of a modulator, a laser, and a detector, and wherein the second optical device can be a Semiconductor Optical Amplifier and a modulator when the first device is the laser or the detector.

In another embodiment, a Photonic Integrated Circuit (PIC) is formed by the process with the steps of: obtaining a Photonic Integrated Circuit (PIC) with a butt-joint between a first core and a second core, wherein the butt-joint comprises a poor quality region, wherein the first core is associated with a first optical device and the second core is associated with a second optical device, and wherein the first optical device and the second optical device are each on the PIC; etching away at least part of the poor quality region to form an etch trench between the first core and the second core; and growing an interconnect core between the first core and the second core in the etch trench. The first core and the second core can each be a Multi-Quantum Well (MQW) structure with different characteristics. The process can further include performing the growing concurrently with a growing step to define a waveguide spot-size converter. The growing the interconnect core can include forming a core layer for optical coupling between the first core and the second core and bounding the bulk layer with cladding layers. The etching away the poor quality region can include removing material from both the first optical device and the second optical device on the PIC.

In a further embodiment, a Photonic Integrated Circuit (PIC) includes a first optical device with a first core formed on the PIC; a second optical device with a second core formed on the PIC; and an etch trench between the first optical device and the second optical device, wherein the etch trench includes an interconnect core between the first core and the second core. The etch trench can further include an extended etch trench formed in part from one or more of the first core and the second core, and wherein the extended etch trench can include a third optical device.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a low loss, defect-free waveguide interconnect between two different Multi-Quantum Well (MQW) active core waveguides in a semiconductor Photonic Integrated Circuit (PIC). The systems and methods relate to a semiconductor PIC with different MQW waveguides having a butt-joint between one another. The semiconductor PIC is fabricated with the butt-joint which as described herein can be of poor quality. The systems and methods include the deliberate removal of at least part of the poor quality MQW material from the butt-joint region and replacement of this material with a waveguide structure which is far less sensitive to non-ideal growth conditions at the butt-joint interface, i.e., a low band-edge wavelength bulk layer. For example, this re-growth step can be combined with an existing growth step used to define a waveguide spot-size converter. Here the term "spot" refers to the optical mode for a given waveguide. Therefore, the systems and methods do not necessarily involve an additional crystal growth step. Effectively, the systems and methods could be extended to create waveguide mode converters between substantially different MQW structures so as to reduce optical coupling losses between them.

In an example use case, it is beneficial to remove a discrete Erbium Doped Fiber Amplifier (EDFA) from transmit optics in an optical modem. In order to remove the EDFA, Semiconductor Optical Amplifiers (SOAs) are needed in a modulator structure to provide the optical amplification necessary to overcome the optical losses in the transmitter. The integration of an SOA into a modulator (e.g., a Coherent Driver Modulator (CDM)) requires the use of two quite different MQW structures within the same PIC. Therefore, such integration would greatly benefit from the systems and methods described herein.

Photonic Integrated Circuits (PICs) (also referred to as integrated optical circuits) are three-dimensional in nature. Photolithography is used to define the pattern of optical waveguides, dielectric insulation, and metal interconnects in a surface plane of the PIC and crystal growth techniques such as with indium phosphide (InP) material, Metal Organic Chemical Vapor Deposition (MOCVD), etc. are used to create the vertical layer structure of semiconductor material. This vertical layer structure includes a core layer which, due to the core layer's high refractive index relative to the cladding layers surrounding it, acts as a guiding layer for an optical field. The core layer is also optimized to perform some optical function, for example, a phase shifter in a high-speed Radio Frequency (RF) traveling wave electrode, an active layer in an SOA, etc. These different functions often require a different optimized core layer design. In a PIC, it is desirable to have many different functions to enable higher levels of integration and performance, and it is therefore often necessary to combine different core layers into one PIC. As described herein, a butt-joint is located where the different optimized core layers meet in the PIC. Existing crystal growth techniques cause a poor quality region at this butt-joint.

Figure 2:
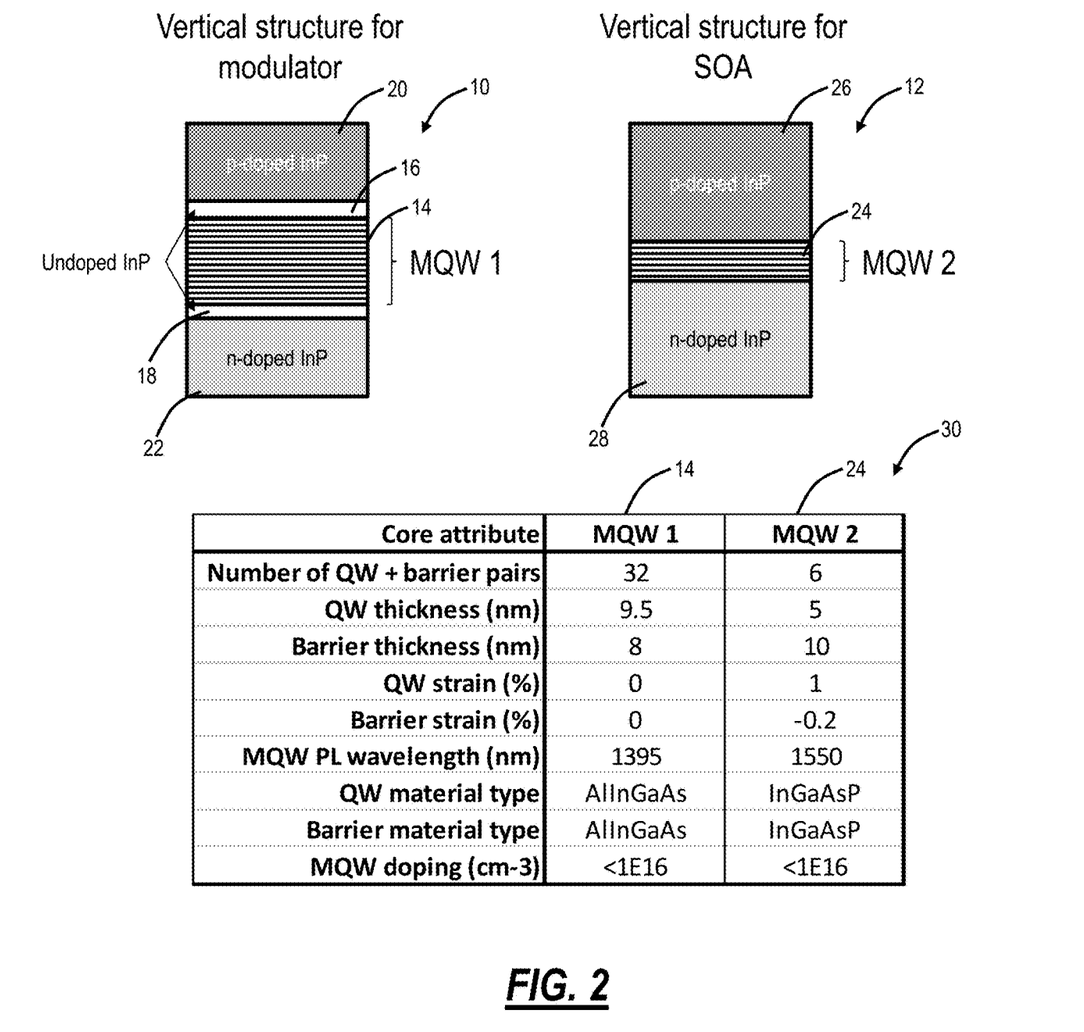
FIG. 2 is a diagram and a table illustrating a vertical structure in a Photonic Integrated Circuit (PIC) for a modulator phase shifter and a Semiconductor Optical Amplifier (SOA)

FIG. 2 is a diagram and a table illustrating a vertical structure in a PIC for a modulator 10 phase shifter and an SOA 12. In the various descriptions herein, the systems and methods are described with reference to a butt-joint in a semiconductor PIC between the modulator 10 and the SOA 12, each having a different MQW structure. Those skilled in the art will recognize the systems and methods contemplate use with any butt-joint between two optical devices which may have different MQW structures, core structures, or other types of structures. Other examples may include a laser and a modulator, a detector and a modulator, etc.

In this example, the modulator 10 has a core 14 which is a Multi-Quantum Well (MQW1) with of 32 pairs of quantum wells and barriers, 9.5 nm and 8 nm thick respectively. These layers include an aluminum-indium-gallium-arsenide (AlInGaAs) alloy and are grown to be zero strain. The MQW of the core 14 for the modulator 10 is bounded by undoped InP 16, 18 which is in turn bounded by a p-doped InP cladding layer 20 and an n-doped InP cladding layer 22. In contrast, the SOA 12 has a core 24 which is an MQW2 including 6 pairs of quantum wells and barriers, 5 nm and 10 nm thick respectively. These layers include an indium-gallium-arsenide-phosphide (InGaAsP) alloy and are grown to have opposing strains with the wells being in compression and the barriers in tension. The core 24 of the SOA is bounded by a p-doped InP cladding layer 26 and an n-doped InP cladding layer 28. Further, a table 30 illustrates characteristics of the cores 14, 24 and it can be seen that these structures are quite different.

Figure 3:
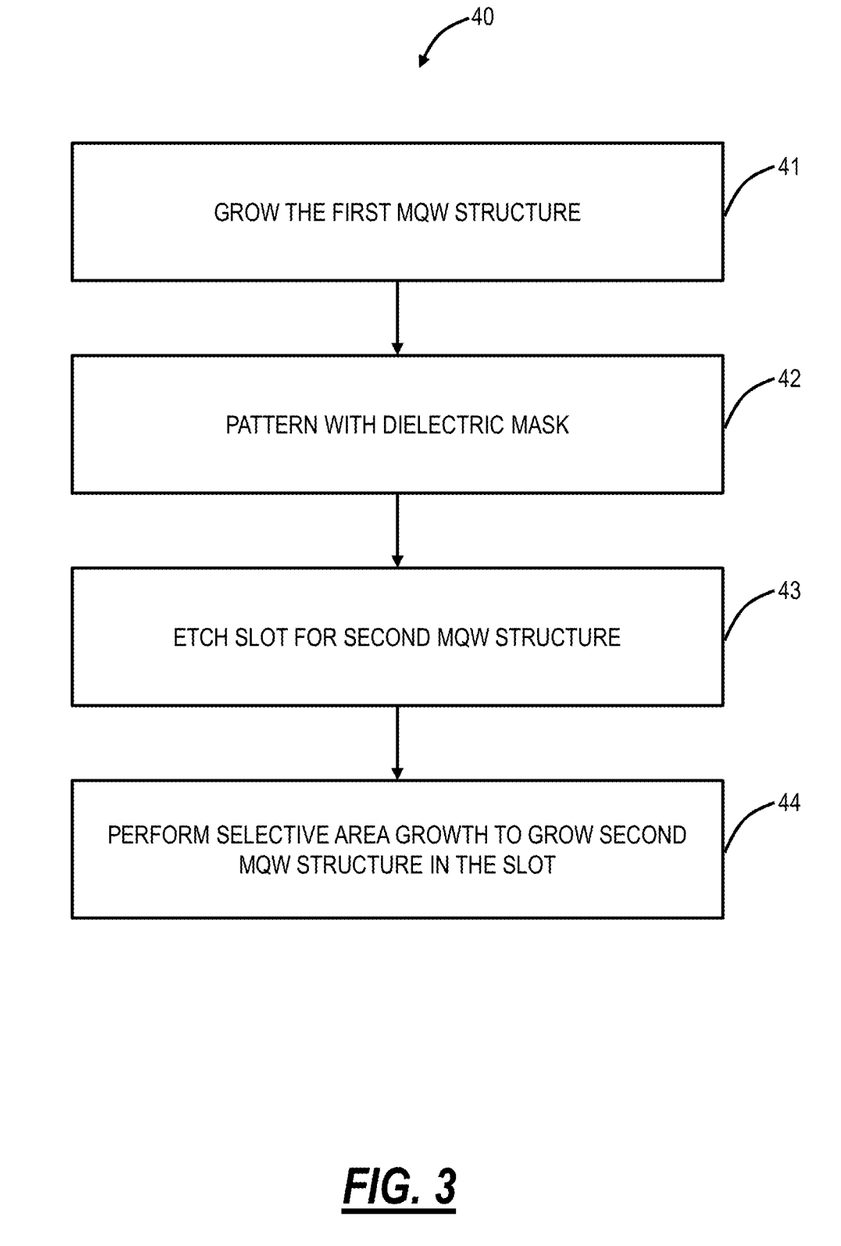
FIG. 3 is a flowchart of a crystal growth process for a PIC which includes the modulator and the SOA, each from FIG. 2.
Figure 4:
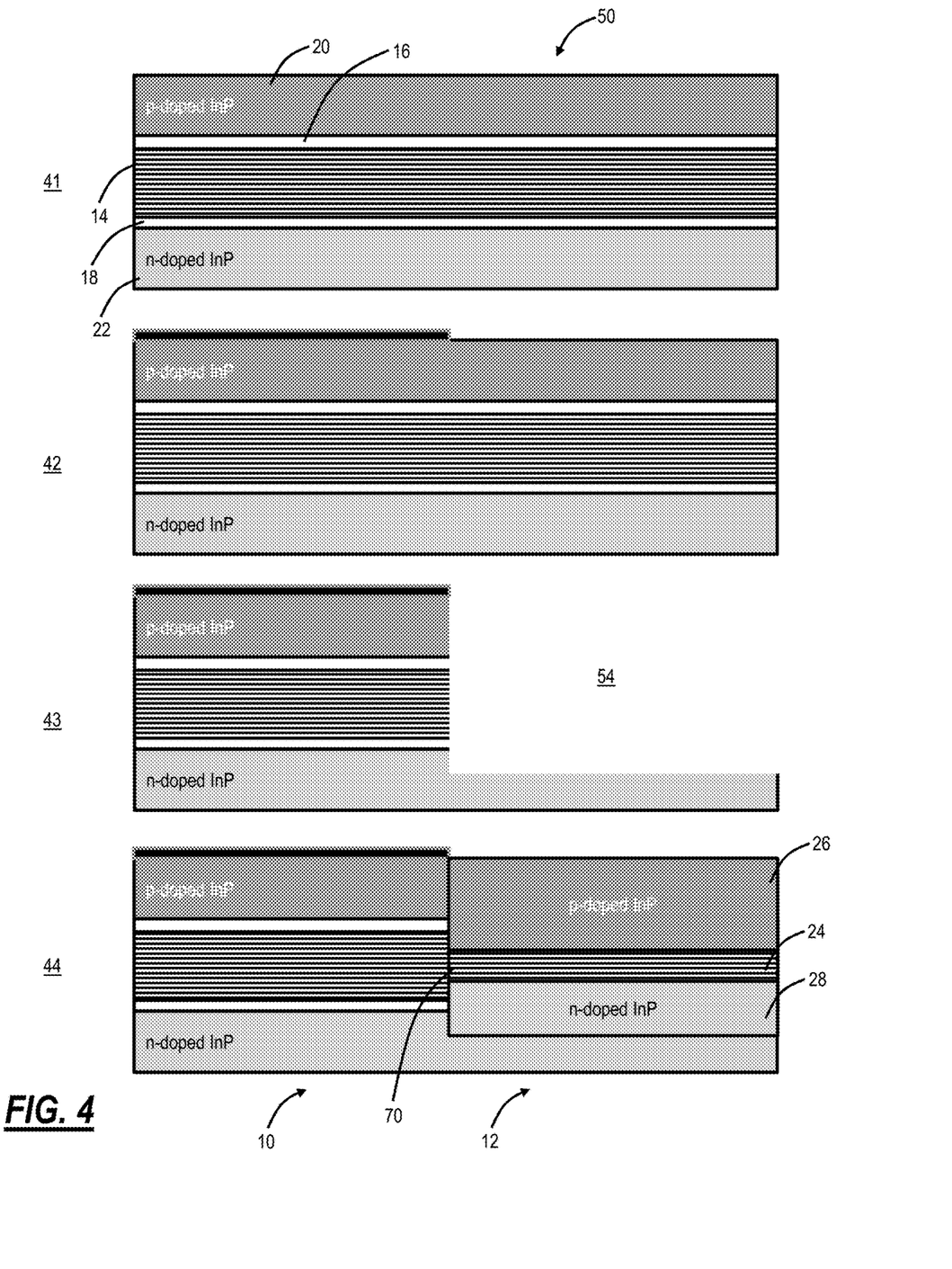
FIG. 4 is a diagram of a corresponding PIC at each step of the crystal growth process of FIG. 3.

FIG. 3 is a flowchart of a crystal growth process 40 for a PIC which includes the modulator 10 and the SOA 12. FIG. 4 is a diagram of a corresponding PIC 50 at each step of the crystal growth process 40. The crystal growth process 40 includes growing a first MQW structure (step 41). In this example, the first MQW structure is that of the modulator 10, i.e., the core 14 bounded by the undoped InP 16, 18 which is in turn bounded by the p-doped InP cladding layer 20 and the n-doped InP cladding layer 22.

Next, the crystal growth process 40 includes patterning the modulator 10 with a dielectric hard mask (step 42). Next, the crystal growth process 40 includes etching a slot 54 for a second MQW structure (step 43). The slot 54 can be etched through the core 14, the undoped InP 18, and into the n-doped InP cladding layer 22. The slot 54 can be etched utilizing Reactive Ion Etch (ME) and/or a wet chemical etch.

Finally, the crystal growth process 40 includes performing Selective Area Growth (SAG) to grow a second MQW structure in the slot 54 (step 44). Again, in this example, the second MQW structure is the SOA 12. A commonly used crystal growth technique is SAG which involves creating a mask pattern on a wafer with an existing layer structure, etching trenches in the wafer according to that pattern, and then in-filling those trenches with a new crystal layer structure.

Unfortunately, the interface between the two MQW structure, i.e., a butt-joint 70 is never as ideal as is shown in the scanning electron micrograph image of FIG. 1. In this example, when MQW 1 (core 14) is etched, usually using ME, damage is induced in the MQW, and this needs to be removed by using a wet chemical treatment. This latter treatment usually creates a gradient to the end face of the etched trench and some under-cutting of the dielectric hard mask. When the MQW 2 (core 24) structure is then grown, there is a poor quality region 60 (FIG. 6) in the vicinity of the butt-joint 70 including high levels of crystal defects and distortions to the layer structure and composition (as deemed 'high' based on its impact on device performance). This is because the growth of the MQW structure is very sensitive to local variations in growth conditions (precursor diffusion rates, temperature, etc.) and such variations can be extensive near the butt-joint 70. An example of this is shown in FIG. 1. This poor quality region 60 has serious consequences on device performance because it can exhibit high optical loss due to absorption and scattering, and represents a reliability hazard due to the high density of defects in an area most likely experiencing electrical current injection or high electric fields.

Figure 5:
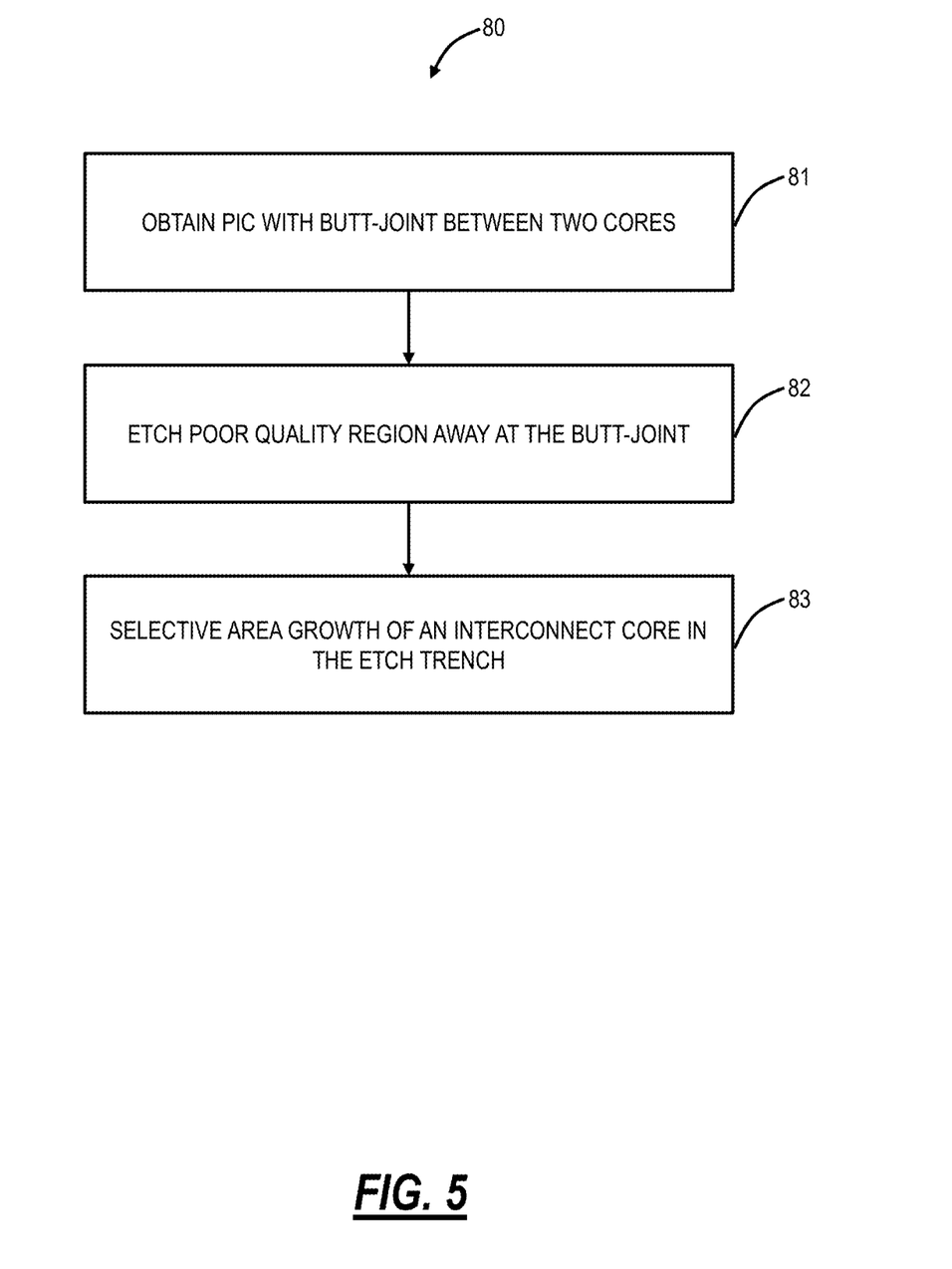
FIG. 5 is a flowchart of a process for a low loss, defect-free waveguide interconnect between two different MQW active core waveguides in a semiconductor PIC.
Figure 6:
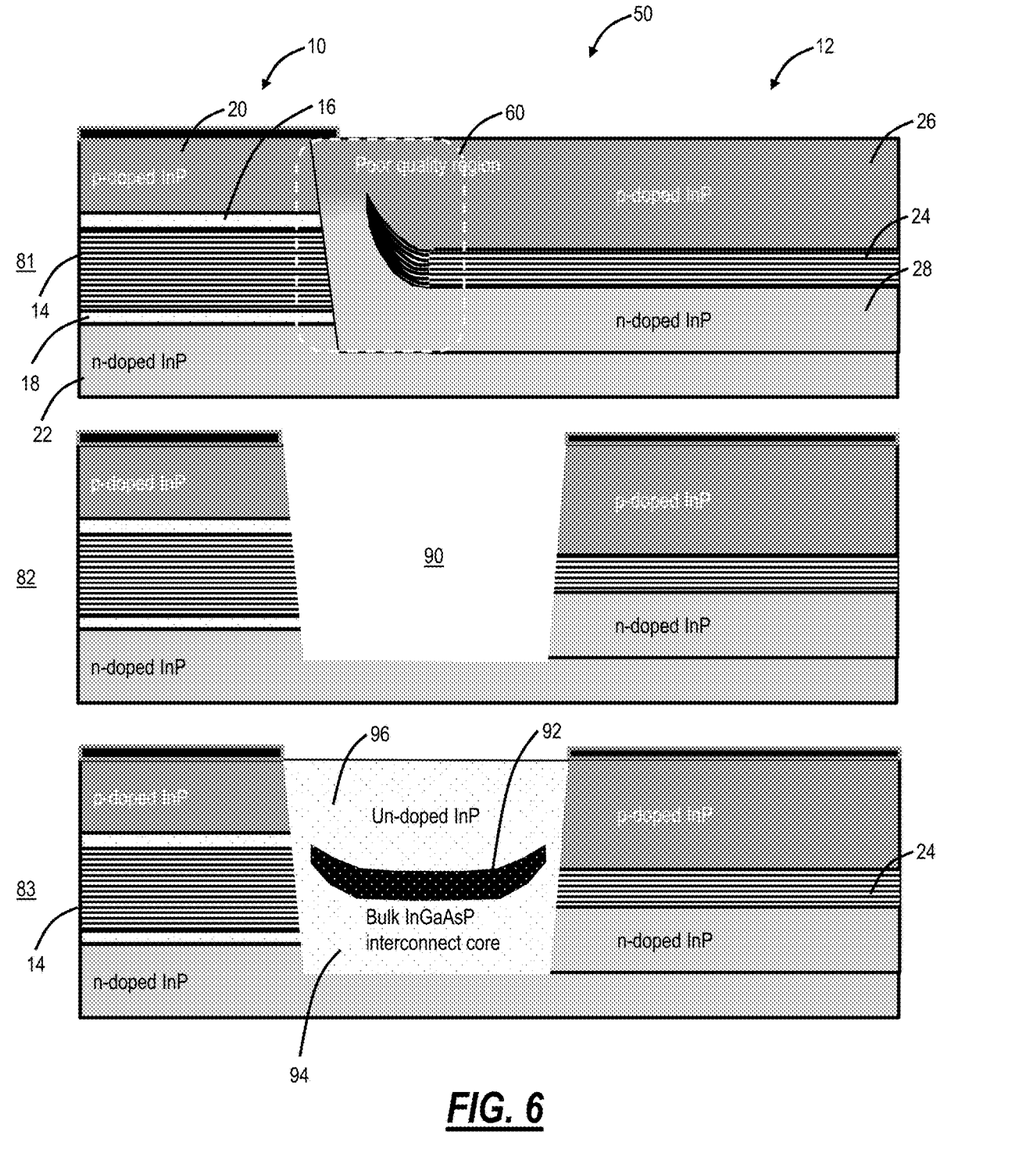
FIG. 6 is a diagram of the PIC at each step of the process of FIG. 5.

FIG. 5 is a flowchart of a process 80 for a low loss, defect-free waveguide interconnect between two different Multi-Quantum Well (MQW) active core waveguides in a semiconductor Photonic Integrated Circuit (PIC). FIG. 6 is a diagram of the PIC 50 at each step of the process 80.

The process 80 involves etching away at least part of the poor quality region 60 and replacing it with a simple bulk layer (i.e., single layer of constant material composition) waveguide where the material of that waveguide is chosen to have high energy (low wavelength) band-edge so as to minimize optical absorption. This "bulk" core layer could be bounded by undoped indium phosphide which is also low loss and has high electrical resistance. Bulk can be defined as a layer of continuous composition generally thicker than 25-30 nm. The bulk core layer should have a low bandgap wavelength composition so as minimize the optical loss of the waveguide. For example, a bandgap wavelength of 1300 nm is possible in an embodiment.

The process 80 includes obtaining a PIC with a butt-joint between two cores (step 81). For example, this can be the PIC 50 formed by the crystal growth process 40. Again, the cores can include MQW structures with different characteristics. Also, the cores can be grown at different points using SAG. Specifically, the two cores 14, 24 and the associated butt-joint 70 has the poor quality region 60.

The process 80 includes etching away the poor quality region 60 at the butt-joint (step 82). This can be performed by repatterning the dielectric hard mask and etching the poor quality region away to form an etch trench 90. In an embodiment, the etch trench 90 could be a minimum of about 10-15 µm long. For example, the poor quality region 60 may be on the order of 1 µm, and the extra length of the etch trench 90 of about 10-15 µm long ensures complete removal of all defective material, and also allows sufficient tolerance for the hard mark and etching processes for the interconnect core 92. Of note, the etch trench 90 extends down to the bottom layer (the n-doped InP cladding layer 22 in this example) and the etch trench 90 is formed in both the modulator 10 and the SOA 12. That is, the etch trench 90 is a removed portion from the PIC 50 and the objective is to remove the poor quality region 60. This includes removal of material from both the modulator 10 and the SOA 12 (or whatever two optical devices are connected via the butt-joint 70). In this example, the etch trench removes a portion of any patterns, the undoped InP 16, 18, the p-doped InP cladding layer 20, the n-doped InP cladding layer 22, the cores 14, 24, the p-doped InP cladding layer 26, and the n-doped InP cladding layer 28.

After the etch trench 90 is formed, the process 80 includes SAG of an interconnect core 92 in the etch trench 90 (step 83). For example, step 83 can include SAG growth of a bulk interconnect core 92 where the bulk InGaAsP photoluminescence wavelength is $\ll 1550$ nm (e.g., 1300 nm). The PIC 50 can include the bulk interconnect core 92 between the cores 14, 24 and undoped layers 94, 96 in the etch trench 90 bounding the bulk interconnect core 92. For example, the undoped layers 94, 96 can be undoped InP.

In FIG. 6, step 83, the bulk interconnect core 92 is illustrated with curves portions near the respective cores 14, 24. This reflects the actual bulk interconnect core 92 after the SAG growth, i.e., the bulk interconnect core 92 material such as bulk InGaAsP tapers upwards slightly at the ends.

Of note, the embodiment of FIG. 6 provides a simple interconnect between the cores 14, 24 with a spot size about the same on both ends of the bulk interconnect core 92. The bulk interconnect core 92 serves a single function, namely, to remove/replace the defective material.

Figure 11:
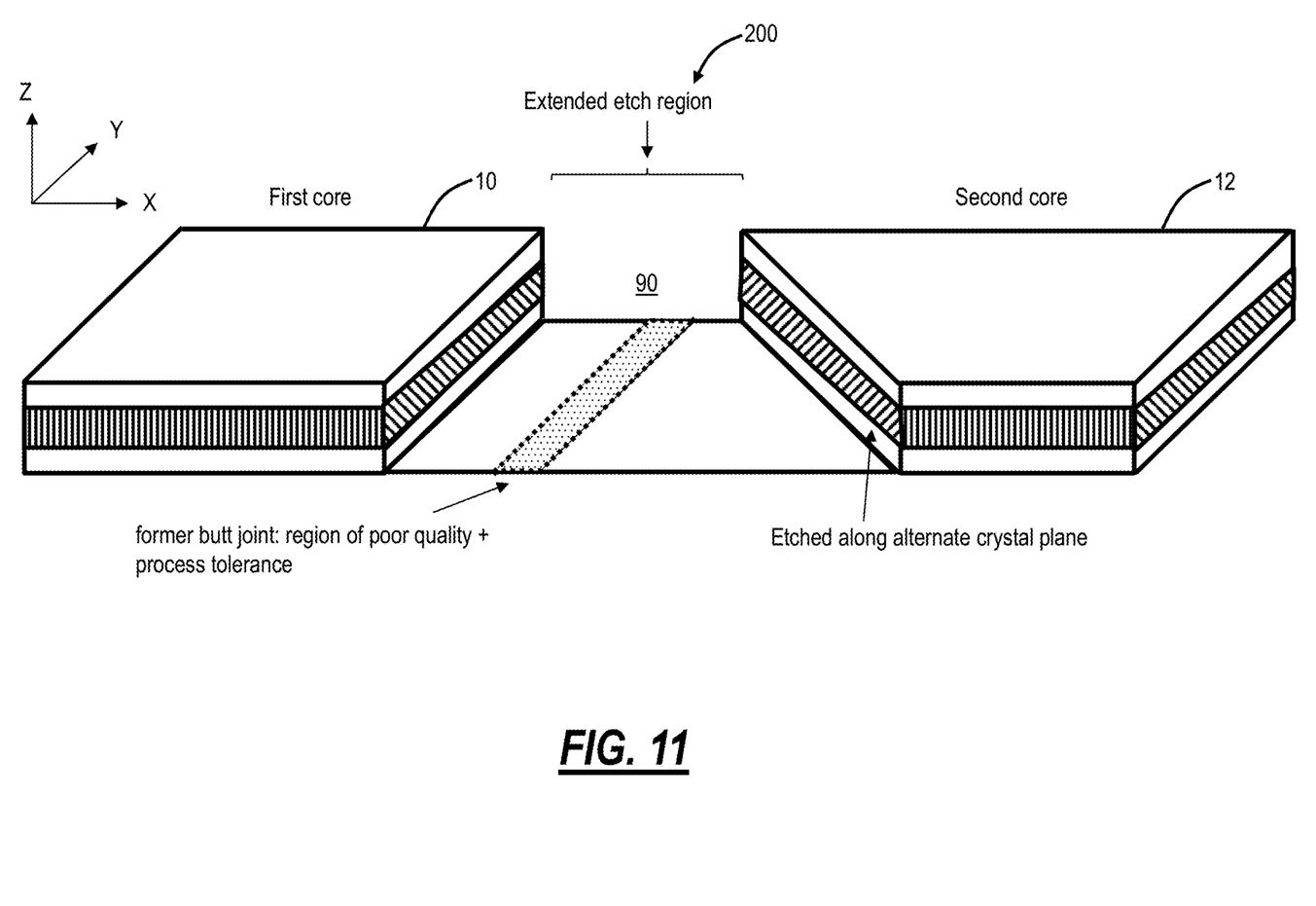
FIG. 11 is a perspective diagram illustrating an example where the etch trench is an extended etch region.

In another embodiment, the length of the etch trench 90 and subsequent in-filled bulk interconnect core 92 can be increased beyond what is required strictly for damage removal and process tolerances, for example an etch trench length of 100 µm, or up to 10000 µm or longer. Furthermore, the etch trench 90 may be formed with similar substantial size in the lateral direction (i.e., into or out of the page in FIG. 6). In addition, the etch trench 90 may be formed at an arbitrary angle relative to the crystal planes, as illustrated in FIG. 11. In all cases, the subsequent bulk interconnect core 92 in-fill may be tapered at one or both ends, as indicated in FIG. 7.

Figure 7:
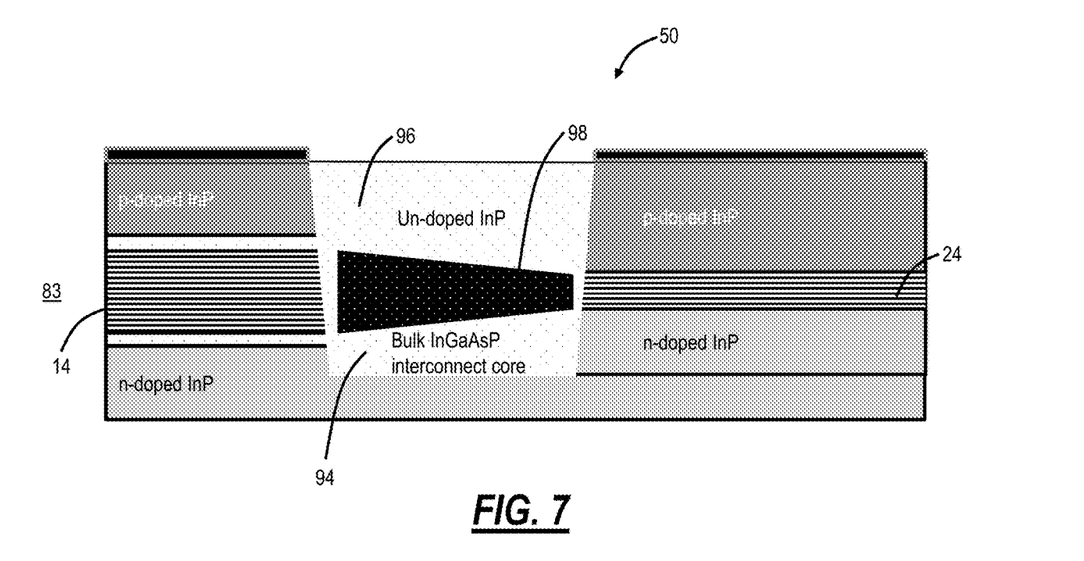
FIG. 7 is a diagram of the PIC with another embodiment where the bulk interconnect core tapers in its thickness to improve optical coupling between the two MQW core designs.

FIG. 7 is a diagram of the PIC 50 with another embodiment where a bulk interconnect core 98 tapers in its thickness to improve optical coupling between the two MQW core 14, 24 designs. Those skilled in the art will recognize various materials and shapes are contemplated in the etch trench 90. That is, the systems and methods remove the poor quality region 60 and replace it with the bulk interconnect core 98 which is a bulk interconnect waveguide between the different cores 14, 24.

The benefits of this bulk interconnect waveguide are the removal of poor morphology, high loss, high defect density MQW material from the butt-joint 70 (the poor quality region 60) improving optical loss and device reliability.

Further, this bulk interconnect waveguide provides electrical resistance between different PIC functions (e.g., a forward bias diode SOA and a reverse bias diode phase electrode).

The embodiment of FIG. 7 has the bulk interconnect core 98 with a different spot size on each end. In comparison with the single function of the embodiment of FIG. 6, the embodiment of FIG. 7 not only removes/replaces the defective material, but also provides a low loss vertical size conversion between the different MQW cores 14, 24.

Again, the systems and methods deliberately remove the poor quality region 60 from the butt-joint 70 and replace of this material with a waveguide structure (the bulk interconnect core 92) far less sensitive to non-ideal growth conditions at the butt-joint 70 interface, i.e., a low band-edge wavelength bulk layer. Again, step 83 could be combined with an existing growth step used to define the waveguide spot-size converter. Therefore, this concept would not necessarily involve an additional crystal growth step. This concept could be extended to create waveguide mode converters between substantially different MQW structures so as to reduce optical coupling losses between them.

In an embodiment, the processes 40, 80 are utilized to form a PIC with a first optical device 10 with a first core 14 formed on the PIC 50; a second optical device 12 with a second core 24 formed on the PIC 50, wherein the first core 14 and the second core 24 are each a Multi-Quantum Well (MQW) structure with different characteristics; and an etch trench 90 between the first optical device 10 and the second optical device 12, wherein the etch trench 90 includes a bulk interconnect core 92 between the first core 14 and the second core 24 and cladding layers 94, 96 bounding the bulk interconnect core.

The first optical device can be a modulator and the second optical device can be a Semiconductor Optical Amplifier. The first optical device can be a laser and the second optical device can be a modulator. The first optical device can be a detector and the second optical device can be a modulator.

Another use for the process 80 and other techniques and approaches described herein allows for the bulk interconnect waveguide to route optical signals over quite long distances (greater than a few hundred microns and generally up to many millimeters) around an InP PIC (rather than a relatively short connection between two different optical functions as described herein in FIGS. 6 and 7). In this case, the bulk waveguide could be designed so as to reduce the waveguide scattering losses and/or allow for tighter waveguide bend radii, the latter helping to reduce the size of the InP PIC and hence reduce device cost.

Figure 8A:
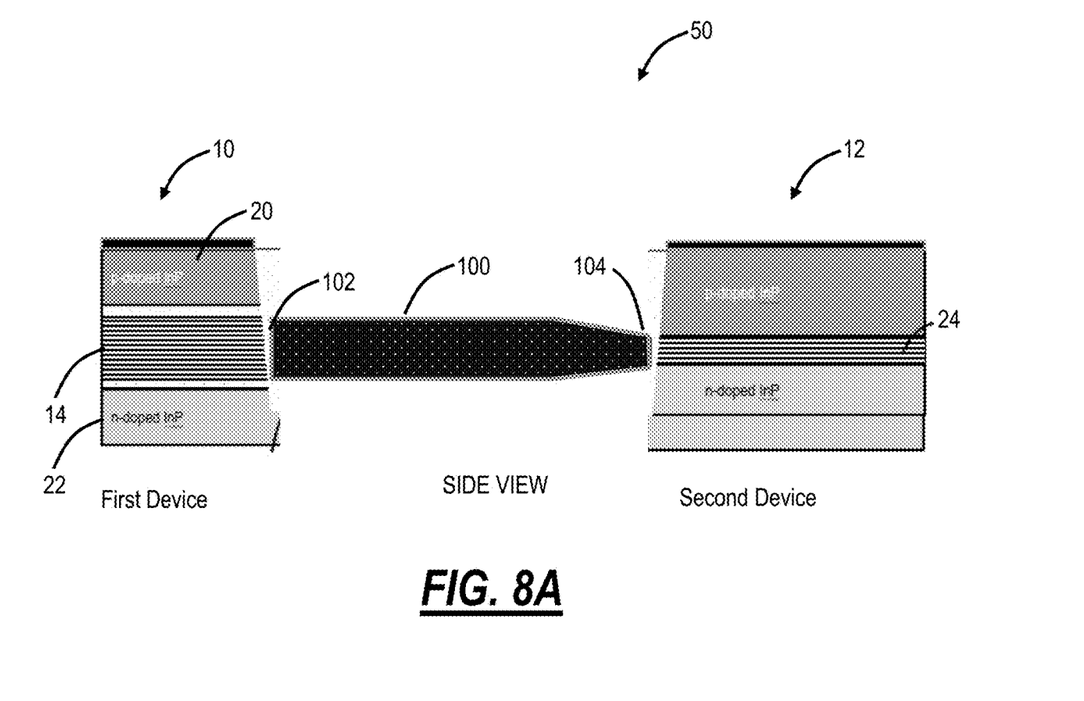
FIGS. 8A and 8B are a side view and a top view of another embodiment of a PIC with a longer bulk interconnect core between the two MQW core designs.
Figure 8B:
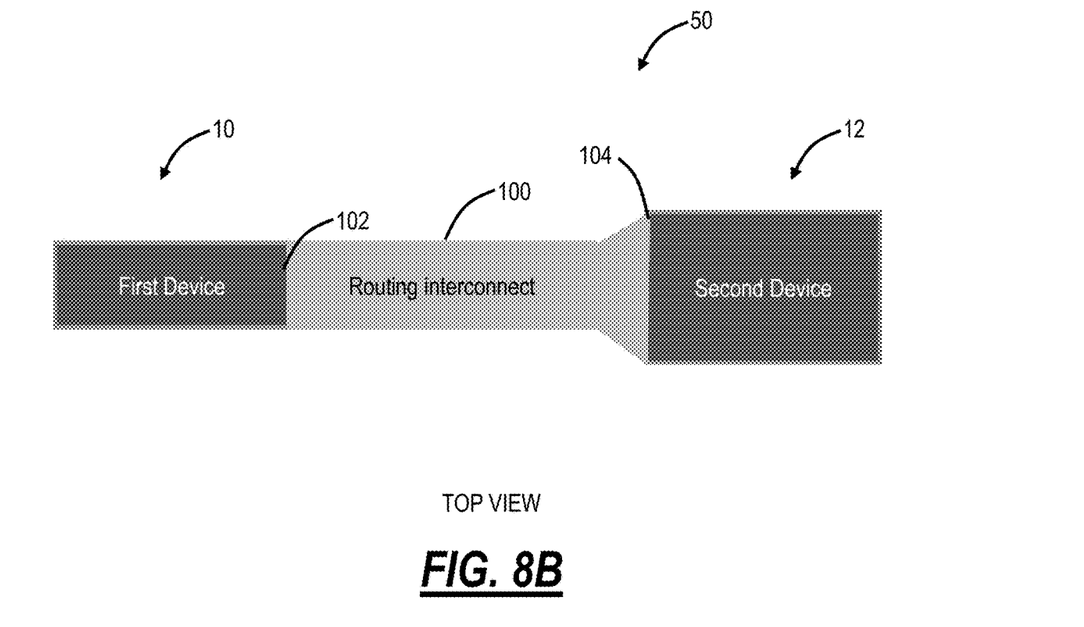

FIGS. 8A and 8B are a side view and a top view of another embodiment of a PIC 50 with a longer bulk interconnect core 100 between the two MQW core 14, 24 designs. The PIC of FIGS. 8A and 8B has a similar structure as in FIGS. 6 and 7, but the longer bulk interconnect core 100 provides a routing interconnect with two spot sizes 102, 104 which are different sizes. The first spot size 102 is larger from a side view (FIG. 8A) but smaller than the second spot size 104 from a top view (FIG. 8B) where the second spot size has a lateral spot size adapted, i.e., a "waveguide flare." The longer bulk interconnect core 100 can be provided using the processes 40, 80 described herein with an elongated intermediate zone between the cores 14, 24.

The embodiment of FIGS. 8A and 8B, compared to the embodiments of FIGS. 6 and 7, provide three functions including removal/replacement of the defective material, providing low loss vertical size conversion between two different MQW cores 12, 14, and providing low loss routing between active devices 10, 12, allowing them to be oriented in an arbitrary geometrical arrangement.

Figure 9:
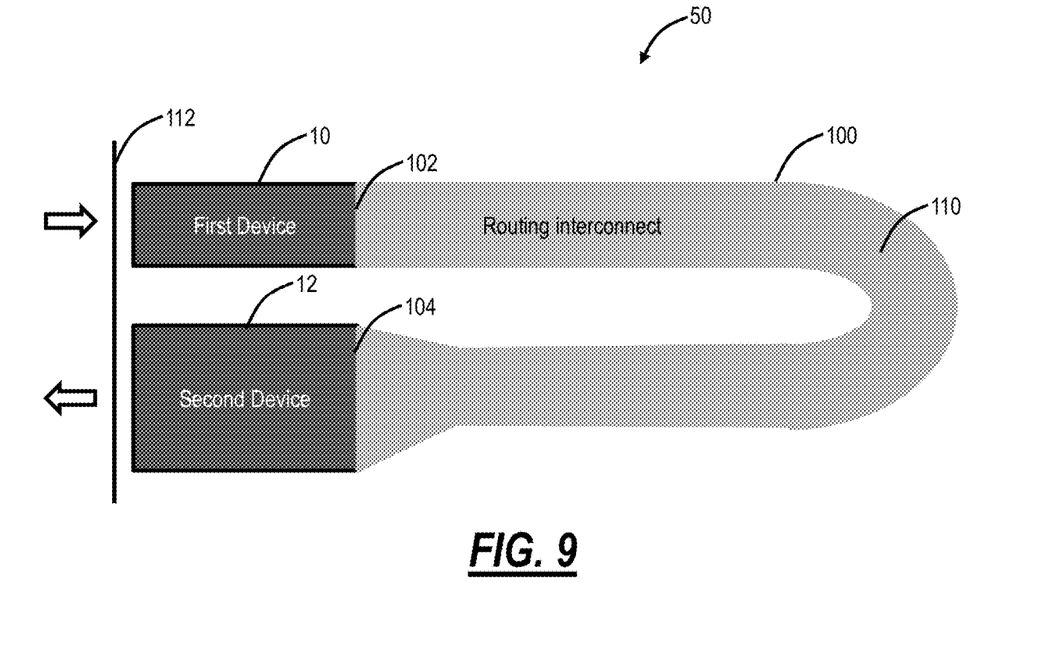
FIG. 9 is a diagram where the devices have I/O on the same side of the PIC with the longer bulk interconnect core having a tight bend.

Thus, the PIC 50 can provide single mode waveguide routing with tight bends and chip I/O (input/output) can be placed in the required location. FIG. 9 is a diagram where the devices 10, 12 have I/O on the same side of the PIC 50 with the longer bulk interconnect core 100 having a tight bend 110. Here, the devices 10, 12 have I/O on a same side (chip facet 112) of the PIC.

Figure 10:
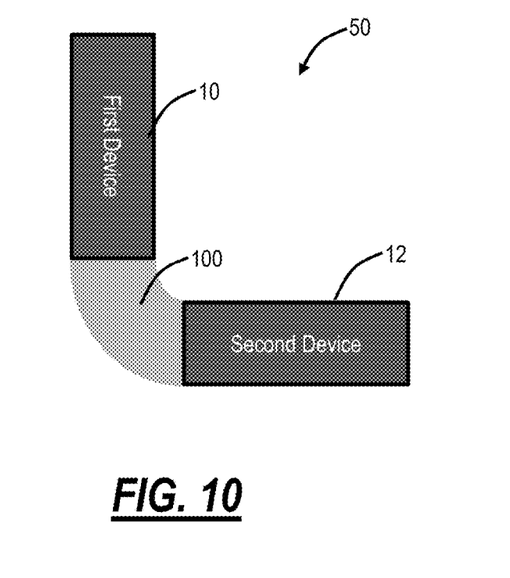
FIG. 10 is a diagram where the devices have different orientations on the PIC relative to one another and with the longer bulk interconnect core.

Also, some active devices 10, 12 operate better in one orientation versus another relative to the crystal plane. FIG. 10 is a diagram where the devices 10, 12 have different orientations on the PIC 50 relative to one another and with the longer bulk interconnect core 100. This can provide compactness at higher scales of integration. Also, in general on a complex PIC, the ability to route and orient devices arbitrarily helps with efficient packing of the circuit. Further, the lateral waveguide dimension can be matched, in addition to the vertical matching described in FIG. 7. This matching is the same as waveguide flare described above, the lateral dimension of the waveguide is adjusted in order to mate the lateral spot size. A well matched spot size has low loss and low optical scattering.

FIG. 11 is a perspective diagram illustrating an example where the etch trench is an extended etch region 200. That is, the extended etch region 200 has been extended beyond the former region of poor quality plus process tolerances. The extended etch region 200 is shown extended into the Y direction, parallel to the butt joint between the first and second growth regions (the first device 10 and the second device 12). The extended etch region 200 has been further extended in the X direction much longer than is strictly needed to remove the region of poor quality. A further feature has been added where an edge of the extended etch region 200 aligns to a crystal plane that is not parallel to the original butt joint. Further extensions of this embodiment to arbitrary geometries of the extended etch region 200 are also contemplated.

Figure 12:
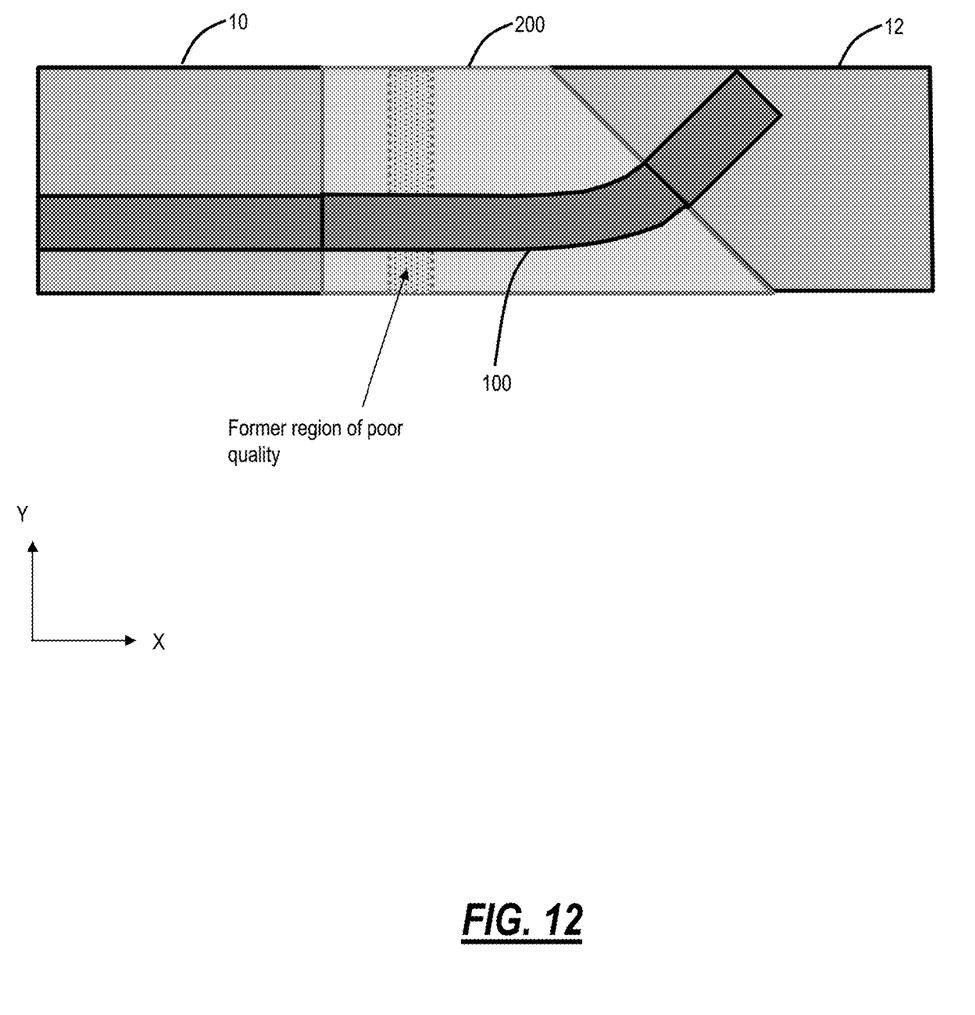
FIG. 12 is a top view of the example of FIG. 11 with an optical routing scheme that is enabled by the extended etch region.

FIG. 12 is a top view of the example of FIG. 11 with an optical routing scheme that is enabled by the extended etch region 200. In this example, the extension of the trench in the X dimension allows the first device 10 to be placed in one location while the second device 12 is placed in a remote location, where the two devices 10, 12 are interconnected via the low loss interconnect region, i.e., the longer bulk interconnect core 100. This might be advantageous, for example, to separate two devices 10, 12 to avoid RF crosstalk, or to enable the routing of yet other monolithically integrated devices (not shown) across the interconnect zone. Also, note that the second device 12 is along a different crystal orientation. This might be advantageous, for example, because certain optical properties of the crystal operate, such as optical gain or phase modulation response, operate better in a different orientation.

With an etch trench and interconnect growth geometry of arbitrary size and shape, one skilled in the art can easily devise further routing and device options. For example, the low loss interconnect region may itself contain a device other than an optical waveguide, such as a multi-mode interference (MMI) device, which can provide optical splitting, combining and mode filtering functions. In large scale integration, the density of components (i.e., the number of components that can be packed per unit area) can be a problem. Using a suitable geometric shape, the extended bulk interconnect layer between devices can provide lower loss waveguides with tight small area bends, enabling efficient routing and packing with little wasted space between devices.

Figure 13:
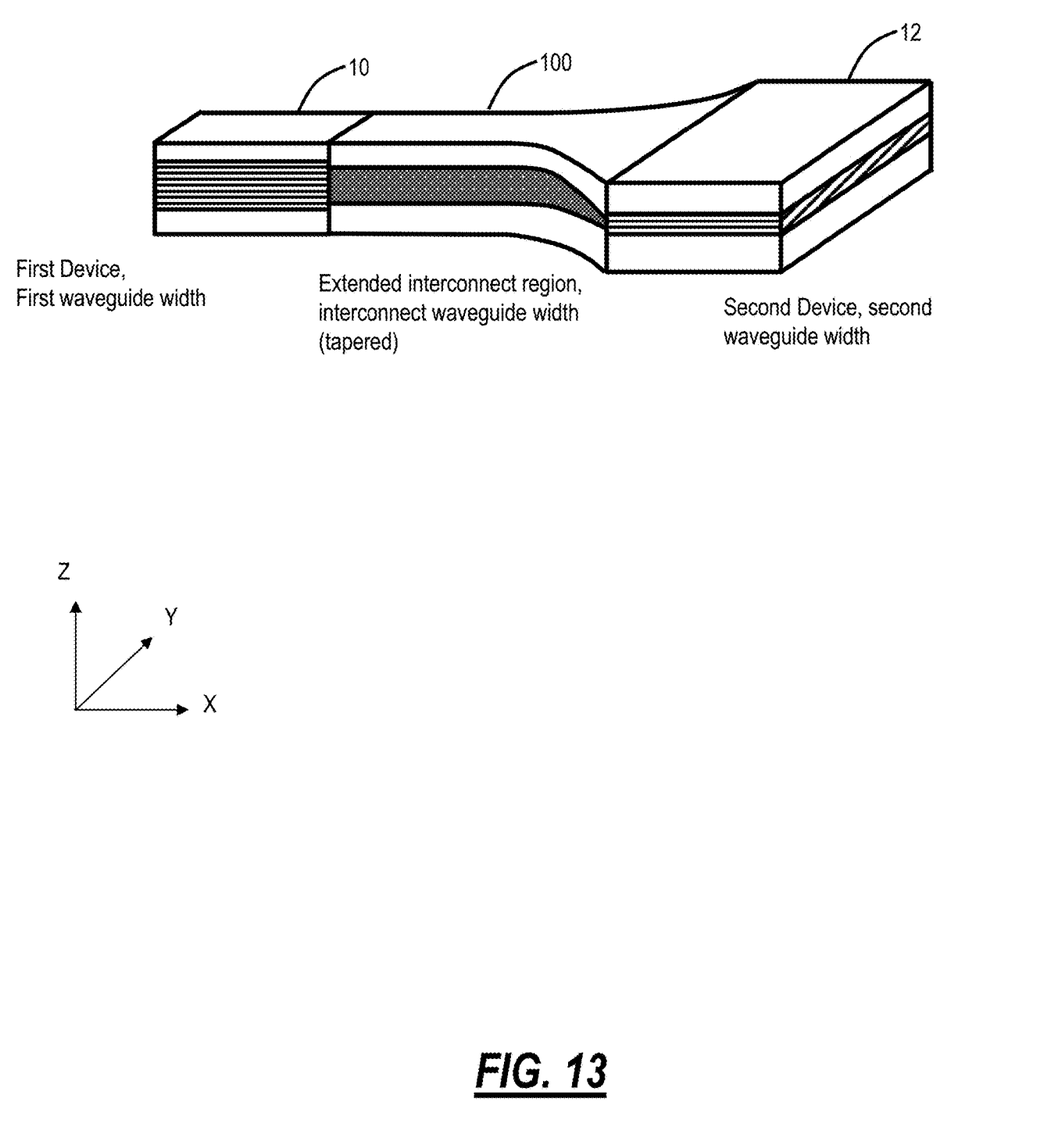
FIG. 13 is a perspective diagram of an example of a deeply etched waveguide, where the guiding structured is formed by etching past the cores and exposing them to air, or encapsulating them in a low index dielectric material.

FIG. 7 illustrates an example where it is desirable to taper the interconnect growth vertically to match the vertical extent of the optical mode of the first device 10 and the second device 12. It is also possible the first device 10 and the second device 12 are optimized when they have different lateral (Y) waveguiding dimensions. FIG. 13 is a perspective diagram of an example of a deeply etched waveguide, where the guiding structured is formed by etching past the cores and exposing them to air, or encapsulating them in a low index dielectric material. The longer bulk interconnect core 100 can be used to adapt the separately optimized waveguide geometries of the first device 10 and the second device 12 using a laterally tapering width, known as a waveguide flare.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
   obtaining a Photonic Integrated Circuit (PIC) with a butt-joint between a first core and a second core, wherein the butt-joint comprises a poor quality region, wherein the first core is associated with a first optical device and the second core is associated with a second optical device, and wherein the first optical device and the second optical device are each on the PIC;
   etching away at least part of the poor quality region to form an etch trench between the first core and the second core; and
   growing an interconnect core between the first core and the second core in the etch trench, wherein the interconnect core is grown with a taper at least at one end, and wherein the interconnect core is formed with each end of the interconnect core bent upward and tapered to reduce a thickness of the interconnect core.

2. The method of claim 1, wherein the first core and the second core are each a Multi-Quantum Well (MQW) structure with different characteristics.

3. The method of claim 2, wherein the different characteristics include any of a number of pairs of quantum wells, thickness, and bounding layers.

4. The method of claim 1, further comprising
   performing the growing concurrently with a growing step to define a waveguide spot-size converter, wherein the taper converts at least one of a lateral width and a thickness at a first end of the interconnect core to a different at least one of a lateral width and a thickness at a second end of the interconnect core.

5. The method of claim 1, wherein the growing the interconnect core includes forming a core layer for optical coupling between the first core and the second core and bounding the core layer with at least one cladding layer.

6. The method of claim 5, wherein the core layer is InGaAsP and the cladding layers are undoped InP.

7. The method of claim 1, wherein the growing utilizes Selective Area Growth (SAG).

8. The method of claim 1, wherein the etching away the poor quality region includes removing material from both the first optical device and the second optical device on the PIC.

9. The method of claim 1, wherein each of the first device, the second device, and the interconnect core have associated with them a laterally guiding waveguide having, respectively, a first lateral width, a second lateral width, and an interconnect lateral width,
   wherein each of the first device, the second device and the interconnect core have, respectively, a first thickness, a second thickness, and an interconnect thickness, and
   wherein the interconnect lateral width tapers to flare in a lateral direction from the first width to the second width and the interconnect thickness tapers to reduce in a thickness direction from the first thickness to the second thickness.

10. The method of claim 1, further comprising
    etching away at least one of the first core and the second core in a second etched region outside and adjacent to the region of poor quality, such that the combination of the etch trench and the second etched region form an extended etch trench,
    wherein the growing the interconnect core includes growing an extended interconnect core within the extended etch trench.

11. The method of claim 10, wherein the extended interconnect core has a third optical device associated with it, and wherein the third optical device is one of a spot size converter, an optical routing device, a multi-mode interference device, and an optical phase shifter.

12. The method of claim 1, wherein the first optical device is one of a modulator, a laser, and a detector, and wherein the second optical device is a Semiconductor Optical Amplifier and a modulator when the first device is the laser or the detector.

13. A Photonic Integrated Circuit (PIC) formed by the process comprising the steps of:
    obtaining a Photonic Integrated Circuit (PIC) with a butt-joint between a first core and a second core, wherein the butt-joint comprises a poor quality region, wherein the first core is associated with a first optical device and the second core is associated with a second optical device, and wherein the first optical device and the second optical device are each on the PIC;
    etching away at least part of the poor quality region to form an etch trench between the first core and the second core; and
    growing an interconnect core between the first core and the second core in the etch trench, wherein the interconnect core is grown with a taper at least at one end, and wherein the interconnect core is formed with each end of the interconnect core bent upward and tapered to reduce a thickness of the interconnect core.

14. The PIC formed by the process of claim 13, wherein the first core and the second core are each a Multi-Quantum Well (MQW) structure with different characteristics.

15. The PIC formed by the process of claim 13, wherein the process further comprises
    performing the growing concurrently with a growing step to define a waveguide spot-size converter, wherein the taper converts at least one of the lateral width and the thickness at a first end of the interconnect core to a different at least one of the lateral width and thickness at a second end of the interconnect core.

16. The PIC formed by the process of claim 13, wherein the growing the interconnect core includes forming a core layer for optical coupling between the first core and the second core and bounding the bulk layer with cladding layers.

17. The PIC formed by the process of claim 13, wherein the etching away the poor quality region includes removing material from both the first optical device and the second optical device on the PIC.

18. A Photonic Integrated Circuit (PIC)
   a first optical device with a first core formed on the PIC;
   a second optical device with a second core formed on the PIC; and
   an etch trench between the first optical device and the second optical device, wherein the etch trench includes an interconnect core grown between the first core and the second core, and wherein the interconnect core is grown with a taper at least at one end, and
   wherein each of the first optical device, the second optical device, and the interconnect core have associated with them a laterally guiding waveguide having, respectively, a first lateral width, a second lateral width, and an interconnect lateral width,
   wherein each of the first optical device, the second optical device and the interconnect core have, respectively, a first thickness, a second thickness, and an interconnect thickness, and
   wherein the interconnect lateral width tapers to flare in a lateral direction from the first width to the second width and the interconnect thickness tapers to reduce in a thickness direction from the first thickness to the second thickness.

19. The PIC of claim 17, wherein the etch trench further includes an extended etch trench formed in part from one or more of the first core and the second core, and wherein the extended etch trench includes a third optical device.

* * * * *

UNITED STATES PATENT AND TRADEMARK OFFICE
CERTIFICATE OF CORRECTION

PATENT NO. : 10,684,414 B1  
APPLICATION NO. : 16/260863  
DATED : June 16, 2020  
INVENTOR(S) : Woods et al.

Page 1 of 1

It is certified that error appears in the above-identified patent and that said Letters Patent is hereby corrected as shown below:

On the Title Page

Under item (73) Assignee, the Assignee should appear as follows:
Ciena Corporation, Hanover, MD (US)

Signed and Sealed this
Fourteenth Day of July, 2020

Andrei Iancu
*Director of the United States Patent and Trademark Office*